US008810145B2

(12) United States Patent
Ooto

(10) Patent No.: US 8,810,145 B2
(45) Date of Patent: Aug. 19, 2014

(54) LIGHTING CIRCUIT AND LUMINAIRE AND A METHOD OF CONTROLLING A LIGHTING CIRCUIT

(71) Applicant: Toshiba Lighting & Technology Corporation, Kanagawa (JP)

(72) Inventor: Katsuya Ooto, Tokyo (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 16 days.

(21) Appl. No.: 13/754,589

(22) Filed: Jan. 30, 2013

(65) Prior Publication Data

US 2014/0125245 A1 May 8, 2014

(30) Foreign Application Priority Data

Nov. 7, 2012 (JP) ................................. 2012-245810

(51) Int. Cl.
*H05B 37/02* (2006.01)
(52) U.S. Cl.
USPC ........................................................ 315/224
(58) Field of Classification Search
USPC ................... 315/51, 52, 127, 128, 200 R, 224
See application file for complete search history.

(56) References Cited

U.S. PATENT DOCUMENTS

| 2005/0023994 | A1* | 2/2005 | Samejima et al. | 315/291 |
|---|---|---|---|---|
| 2007/0236518 | A1 | 10/2007 | Oto et al. | |
| 2009/0302768 | A1* | 12/2009 | Hung et al. | 315/127 |
| 2009/0315470 | A1* | 12/2009 | Kumagai et al. | 315/224 |
| 2011/0140616 | A1* | 6/2011 | Yan et al. | 315/186 |
| 2012/0299503 | A1* | 11/2012 | Aharon | 315/224 |
| 2012/0319604 | A1* | 12/2012 | Walters | 315/200 R |
| 2013/0328496 | A1* | 12/2013 | Chen et al. | 315/224 |
| 2014/0035479 | A1* | 2/2014 | Hsieh et al. | 315/224 |

FOREIGN PATENT DOCUMENTS

JP 2004-312909 11/2004

OTHER PUBLICATIONS

European Search Report dated Feb. 3, 2014 for Application No. 13 15 2112.
"AN2389 Application note Contents", Aug. 21, 2007, XP055099719, www.st.com. An MCU-based low cost non-inverting buck-boost converter for battery chargers.

* cited by examiner

*Primary Examiner* — Thienvu Tran
(74) *Attorney, Agent, or Firm* — Patterson & Sheridan LLP

(57) ABSTRACT

According to one embodiment, a lighting circuit includes a high potential input terminal, a low potential input terminal, a high potential output terminal, a low potential output terminal, first and second switching elements, first and second rectifying elements, an inductor and a control circuit. The first switching element has one end connected to the high potential input terminal. The first rectifying element is connected between one other end of the first switching element and the low potential input terminal. The inductor has one end connected to the one other end of the first switching element. The second switching element is connected between one other end of the inductor and the low potential input terminal. The second rectifying element is connected between the one other end of the inductor and the high potential output terminal. The control circuit turns on or off the first and second switching elements.

19 Claims, 2 Drawing Sheets

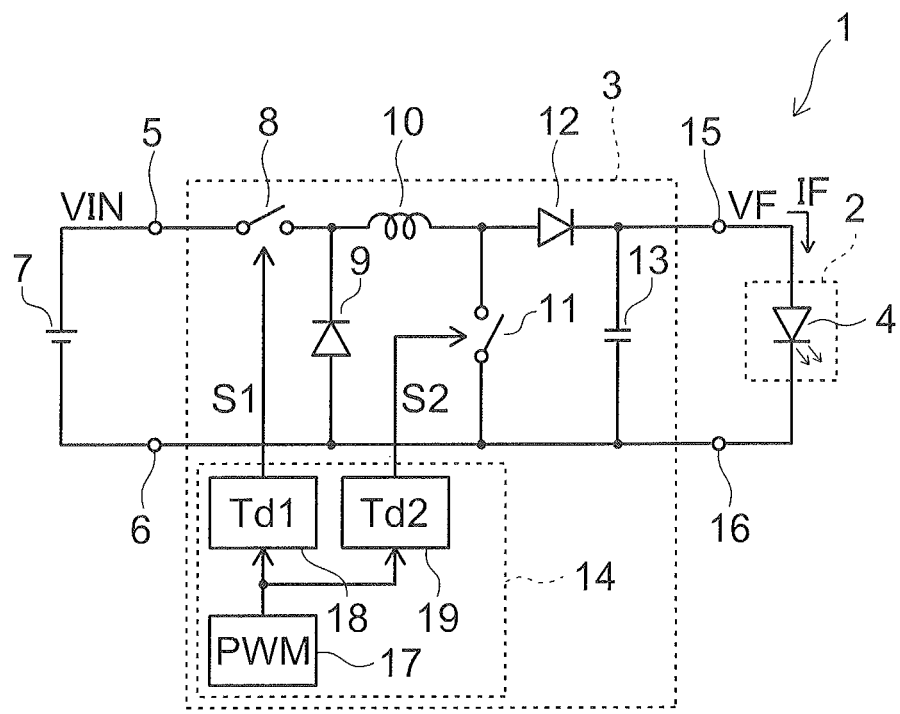
FIG. 1
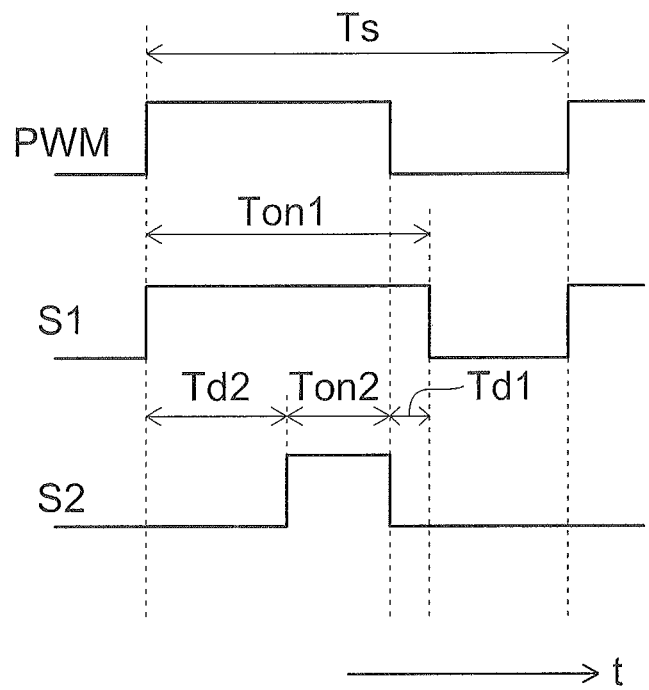
FIG. 2A
FIG. 2B
FIG. 2C

LIGHTING CIRCUIT AND LUMINAIRE AND A METHOD OF CONTROLLING A LIGHTING CIRCUIT

CROSS-REFERENCE TO RELATED APPLICATIONS

This application is based upon and claims the benefit of priority from the prior Japanese Patent Application No. 2012-245810, filed on Nov. 7, 2012; the entire contents of which are incorporated herein by reference.

FIELD

Embodiments described herein relate generally to a lighting circuit and a luminaire and a method of controlling a lighting circuit.

BACKGROUND

A switching power supply such as a DC-DC converter is a power supply which has high efficiency and is suitable for reducing power consumption and size, and is used as, for example, a lighting circuit in a luminaire. In such a switching power supply, for example, a rising-falling type structure capable of raising and reducing voltage can be used also in a case where an input voltage and an output voltage are close to each other.

In recent years, as an illumination light source in the luminaire, an incandescent lamp or a fluorescent lamp is being replaced with an energy-saving and long-life light source, for example, a light-emitting diode (LED). Besides, a new illumination light source such as, for example, an electro-luminescence (EL) or organic light-emitting diode (OLED) is also developed. Thus, the lighting circuit for lighting the illumination light source is also required to have higher efficiency.

BRIEF DESCRIPTION OF THE DRAWINGS

FIG. 1 is a circuit diagram exemplifying a luminaire including a lighting circuit of a first embodiment;

FIGS. 2A to 2C are waveform views exemplifying main signals of a control circuit;

DETAILED DESCRIPTION

Figure 3:
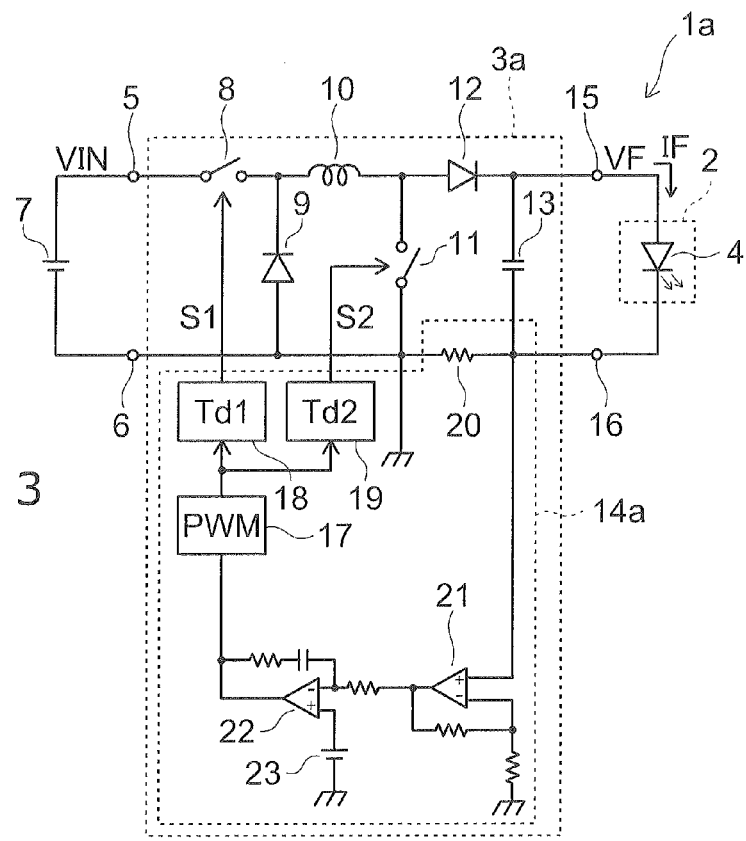
FIG. 3 is a circuit diagram exemplifying a luminaire including a lighting circuit of a second embodiment.

In general, according to one embodiment, a lighting circuit includes a high potential input terminal, a low potential input terminal, a high potential output terminal, a low potential output terminal, first and second switching elements, first and second rectifying elements, an inductor and a control circuit. The high potential input terminal is connected to one end of an external power supply. The low potential input terminal is connected to one other end of the external power supply. The high potential output terminal is connected to one end of an illumination load. The low potential output terminal is connected to one other end of the illumination load. The first switching element has one end connected to the high potential input terminal. The first rectifying element is connected between one other end of the first switching element and the low potential input terminal. A forward direction of the first rectifying element is a direction from the low potential input terminal to the first switching element. The inductor has one end connected to the one other end of the first switching element. The second switching element is connected between one other end of the inductor and the low potential input terminal. The second rectifying element is connected between the one other end of the inductor and the high potential output terminal. A forward direction of the second rectifying element is direction from the inductor to the high potential output terminal. The control circuit is configured to turn off the second switching element at a time earlier by at least a first time than a time when the control circuit turns the first switching element from on to off.

Hereinafter, embodiments will be described in detail with reference to the drawings. Incidentally, components similar to those described in former drawings are denoted by the same reference numerals and their explanation is suitably omitted.

First Embodiment

FIG. 1 is a circuit diagram exemplifying a luminaire including a lighting circuit of a first embodiment.

The luminaire 1 of FIG. 1 includes an illumination load 2 and a lighting circuit 3 for supplying power to the illumination load 2.

The illumination load 2 includes an illumination light source 4 such as, for example, an LED, and lights by being supplied with power (output voltage VF, output current IF) from the lighting circuit 3.

The lighting circuit 3 converts power supplied from a power supply 7 and outputs it to the illumination load 2. The lighting circuit 3 includes a first switching element 8, a first rectifying element 9, an inductor 10, a second switching element 11, a second rectifying element 12, a capacitor 13 and a control circuit 14. The lighting circuit 3 may have, for example, a structure in which part of these is formed on a semiconductor substrate and integrated into one chip or multiple chips.

The lighting circuit 3 converts a DC voltage VIN inputted between a high potential input terminal 5 and a low potential input terminal 6 which are a pair of input terminals, and outputs the output voltage VF and the output current IF between a high potential output terminal 15 and a low potential output terminal 16 which are a pair of output terminals. Incidentally, the power supply 7 has only to supply a DC voltage, and is, for example, a battery or a DC power supply in which an AC power supply is converted into a DC voltage.

The first switching element 8 is, for example, a field effect transistor (FET), and includes a first main electrode, a second main electrode and a control terminal. One end (first main electrode) of the first switching element 8 is connected to the high potential input terminal 5 of the lighting circuit 3. The other end (second main electrode) of the first switching element 8 is connected to the first rectifying element 9 and the inductor 10.

The first rectifying element 9 is, for example, a diode, and includes a cathode and an anode. The cathode of the first rectifying element 9 is connected to the other end of the first switching element 8 and the inductor 10, and the anode of the first rectifying element 9 is connected to the low potential input terminal 6 of the lighting circuit 3. The first rectifying element 9 is connected while a direction from the low potential input terminal 6 to the first switching element 8 is a forward direction.

One end of the inductor 10 is connected to the other end of the first switching element 8, and the other end of the inductor 10 is connected to the second switching element 11 and the second rectifying element 12.

The second switching element 11 is, for example, an FET, and includes a first main electrode, a second main electrode and a control terminal. One end (second main electrode) of the second switching element 11 is connected to the other end of the inductor 10, and the other end (first main electrode) of the second switching element 11 is connected to the low potential input terminal 6 of the lighting circuit 3.

The second rectifying element 12 is, for example, a diode, and includes an anode and a cathode. The anode of the second rectifying element 12 is connected to the other end of the inductor 10 and one end of the second switching element 11. The cathode of the second rectifying element 12 is connected to the high potential output terminal 15 of the lighting circuit 3 and the capacitor 13. The second rectifying element 12 is connected while a direction from the inductor 10 to the high potential output terminal 15 is a forward direction.

The capacitor 13 is connected between the high potential output terminal 15 and the low potential output terminal 16 of the lighting circuit 3.

The control circuit 14 includes a PWM (pulse width modulation) circuit 17, a delay circuit (first delay circuit) 18 and a delay circuit (second delay circuit) 19. The control circuit 14 turns on or off the first switching element 8 and the second switching element 11, and controls, for example, at least one of the output voltage VF and the output current IF to a specified value. Besides, the control circuit 14 turns on the first switching element 8, and then turns off the second switching element 11 at least at a time (first time) Td1 before the control circuit turns the switching element 8 from on to off.

FIGS. 2A to 2C are waveform views exemplifying main signals of the control circuit, in which FIG. 2A shows a PWM signal, FIG. 2B shows a control signal (first control signal), and FIG. 2C shows a control signal (second control signal) S2.

The PWM circuit 17 generates the PWM (pulse width modulation) signal to turn on or off the first switching element 8 and the second switching element 11 (FIG. 2A). The PWM circuit 17 detects, for example, at least one of the output voltage VF and the output current IF, and controls the duty ratio (ratio of on period to one period Ts) of at least one of the first switching element 8 and the second switching element 11.

The delay circuit 18 is a circuit to generate the control signal S1 in which the falling of the PWM signal generated by the PWM circuit 17 is delayed by the time (first time) Td1 (FIG. 2B). The delay circuit 19 is a circuit to generate the control signal S2 in which the rising of the PWM signal generated by the PWM circuit 17 is delayed by a time (second time) Td2 (FIG. 2C).

The control circuit 14 turns on the first switching element 8, and then turns off the second switching element 11 at a time earlier by the time Td1 than a time when the first switching element 8 is turned off from on. Besides, the control circuit 14 turns on the second switching element 11 after the time Td2 elapses after the first switching element 8 is turned on.

A time Ton1 in which the first switching element 8 is on is longer than the high-level period of the PWM signal by the time Td1. Besides, a time Tong in which the second switching element 11 is on is shorter than the high-level period of the PWM signal by the time Td2. Incidentally, the time Td1 can be set to be shorter than the time Td2.

Next, the operation of the luminaire 1 including the lighting circuit 3 will be described.

At power-on, when the control circuit 14 changes the control signal S1 from the low level to the high level at time t=0, the first switching element 8 is turned on. At this time, a current flows through a path of the power supply 7, the first switching element 8, the inductor 10 and the second rectifying element 12, and the capacitor 13 is charged.

Besides, a current flowing through the inductor 10 increases, is constant or decreases according to a voltage difference between the inputted DC voltage VIN and the output voltage VF charged in the capacitor 13. For example, if the DC voltage VIN is higher than the output voltage VF, power is supplied from the power supply 7, and the increasing current flows through the inductor 10. If the DC voltage VIN is equal to the output voltage VF, the constant current flows through the inductor 10 by energy stored in the inductor 10. If the DC voltage VIN is lower than the output voltage VF, the decreasing current flows through the inductor 10 by the energy stored in the inductor 10.

When the control circuit 14 changes the control signal S2 from the low level to the high level at time t=Td2, the second switching element 11 is turned on. At this time, a current flows through a path of the power supply 7, the first switching element 8, the inductor 10 and the second switching element 11. The current flowing through the inductor 10 increases, and energy is stored in the inductor 10.

When the control circuit 14 changes the control signal S2 from the high level to the low level at time t=Td2+Ton2, the second switching element 11 is turned off. At this time, the first switching element 8 remains on, a current flows through the path of the power supply 7, the first switching element 8, the inductor 10 and the second rectifying element 12, and the capacitor 13 is charged. The voltage charged in the capacitor 13 is outputted as the output voltage VF to the high potential output terminal 15 and the low potential output terminal 16.

Also in this case, the current flowing through the inductor 10 increases, is constant or decreases according to the voltage difference between the inputted DC voltage VIN and the output voltage VF charged in the capacitor 13. For example, if the DC voltage VIN is higher than the output voltage VF, power is supplied from the power supply 7, and the increasing current flows through the inductor 10. If the DC voltage VIN is equal to the output voltage VF, the constant current flows through the inductor 10 by the energy stored in the inductor 10. If the DC voltage VIN is lower than the output voltage VF, the decreasing current flows through the inductor 10 by the energy stored in the inductor 10.

When the control circuit 14 changes the control signal S1 from the high level to the low level at time t=Ton1, the first switching element 8 is turned off. At this time, a current flows through a path of the first rectifying element 9, the inductor 10 and the second rectifying element 12 by the energy stored in the inductor 10, and the capacitor 13 is charged.

A next period occurs at time t=Ts and when the control circuit 14 changes the control signal S1 from the low level to the high level, the first switching element 8 is turned on, and the above operation is repeated. The capacitor 13 is charged, and the voltage of the capacitor 13, that is, the output voltage VF rises. When the output voltage VF becomes higher than the forward direction voltage of the illumination load 2, the illumination load 2 is lit.

In the steady state, the control circuit 14 outputs the low level control signal S2 until the time Td2 elapses after the control circuit 14 changes the control signal S1 from the low level to the high level and after the first switching element 8 is turned on. The second switching element 11 is off. At this time, the current flows to the capacitor 13 and the illumination load 2 through the power supply 7, the first switching element 8, the inductor 10 and the second rectifying element 12.

As described above, the current flowing through the inductor 10 increases, is constant or decreases according to the voltage difference between the inputted DC voltage VIN and the output voltage VF charged in the capacitor 13.

Next, when the time Td2 elapses and the control circuit 14 changes the control signal S2 from the low level to the high level, the second switching element 11 is turned on. The current flows through the path of the power supply 7, the first switching element 8, the inductor 10 and the second switching element 11, and energy is stored in the inductor 10.

Further, when the control circuit 14 changes the control signal S2 from the high level to the low level after the time Ton2 elapses, the second switching element 11 is turned off. The current flows to the capacitor 13 and the illumination load 2 through the power supply 7, the first switching element 8, the inductor 10 and the second rectifying element 12.

As described above, at this time, the current flowing through the inductor 10 increases, is constant or decreases according to the voltage difference between the inputted DC voltage VIN and the output voltage VF charged in the capacitor 13.

Further, when the control circuit 14 changes the control signal S1 from the high level to the low level after the time Td1 elapses, the first switching element 11 is turned off. The current flows to the capacitor 13 and the illumination load 2 through the first rectifying element 9, the inductor 10 and the second rectifying element 12 by the energy stored in the inductor 10.

When one period Ts elapses and the control circuit 14 changes the control signal S1 from the low level to the high level, the first switching element 8 is turned on, and the above operation is repeated in the next and subsequent cycles.

When the ratio (Td1+Td2)/Ts of the added time Td1+Td2 of the delay time Td1 and the delay time Td2 to the period Ts is Dd, and the duty ratio of the first switching element 8 is Don=Ton1/Ts, the ratio VF/VIN of the output voltage VF to the inputted DC voltage VIN is represented by equation (1).

$$VF/VIN = Don/(1-Don+Dd) \qquad (1)$$

For example, if the delay circuit 18 is not provided, and the control signals S1 and S2 are simultaneously changed from the high level to the low level, there is a possibility that a period in which the first switching element 8 is off and the second switching element 11 is on occurs by the skew (timing shift) of the control signals S1 and S2 or the fluctuation of threshold voltages of the first switching element 8 and the second switching element 11. At this time, since a current flows through a path of the first rectifying element 9, the inductor 10 and the second switching element 11, loss due to the first rectifying element 9 and the second switching element 11 occurs.

On the other hand, in this embodiment, the control circuit 14 changes the control signal S2 from the high level to the low level at the time earlier by the time Td1 than the time when the control circuit 14 changes the control signal S1 from the high level to the low level. As a result, the period in which the control signal S1 is off and the control signal S2 is on does not occur, and the loss due to the current flowing through the path of the first rectifying element 9, the inductor 10 and the second switching element 11 is suppressed.

Incidentally, the time Td1 is sufficient if the current can be suppressed from flowing through the path of the first rectifying element 9, the inductor 10 and the second switching element 11, and the time Td1 can be set to be shorter than the time Td2.

Besides, the control circuit 14 turns on the first switching element 8, and then turns off the second switching element 11 at the time earlier by at least the time Td1 before the first switching element 8 is turned off from on.

Accordingly, as shown in FIGS. 2A to 2C, after the time Td2 elapses after the first switching element 8 is turned on, the control circuit 14 can turn on the second switching element 11 during the time Tong. For example, the control circuit 14 sets so that the time Ton1 during which the first switching element 8 is on and the delay times Td1 and Td2 satisfy the relation of equation (2).

$$Ton1 > Td1 + Td2 > 0, Td2, Td1 > 0 \qquad (2)$$

Besides, the control circuit 14 can be generated the control signal S2 of the low level. Thus, the second switching element 11 can be maintained in the off during the whole period. That is, the control circuit 14 maintains the second switching element 11 in the off. The control circuit 14 sets so that the time Ton1 during which the first switching element 8 is on and the delay time Td2 satisfy the relation of, for example, Ton1<Td2. At this time, the lighting circuit operates as the falling pressure type.

Second Embodiment

FIG. 3 is a circuit diagram exemplifying a luminaire including a lighting circuit of a second embodiment.

A luminaire 1a of this embodiment is different from the luminaire of the first embodiment in the structure of the lighting circuit 3, and includes a lighting circuit 3a instead of the lighting circuit 3. The structure of the luminaire 1a other than the lighting circuit 3a is the same as the structure of the luminaire 1.

The lighting circuit 3a is different from the lighting circuit 3 of the first embodiment in the structure of the control circuit 14, and includes a control circuit 14a instead of the control circuit 14. The structure of the lighting circuit 3a other than the control circuit 14a is the same as the structure of the lighting circuit 3.

In the control circuit 14a, a detection resistor 20, amplifier circuits 21 and 22, and a reference voltage source 23 are added to the control circuit 14 including the PWM circuit 17 and the delay circuits 18 and 19.

The detection resistor 20 is connected between a low potential input terminal 6 and a low potential output terminal 16, and detects an output current IF of the lighting circuit 3a as a voltage proportional to the output current IF.

The amplifier circuit 21 is connected to the detection resistor 20, and amplifies the voltage proportional to the output current IF detected by the detection resistor 20.

The amplifier circuit 22 is an error amplifier circuit to compare the detected output current IF and a reference voltage generated by the reference voltage source 23 and to amplify.

Incidentally, each of the amplifier circuits 21 and 22 can be constructed of an operational amplifier circuit, a resistor and the like. Besides, the amplifier circuits 21 and 22 may have another structure as long as the detected output current IF and the reference voltage are compared and the error can be amplified.

In this embodiment, since the control circuit 14a detects the output current IF and controls it to a specified value, the output current IF can be stabilized to the specified value in addition to the effects of the first embodiment.

Besides, the output voltage VF can be reduced in the vicinity of the inputted DC voltage VIN and can also be raised.

Third Embodiment

Figure 4:
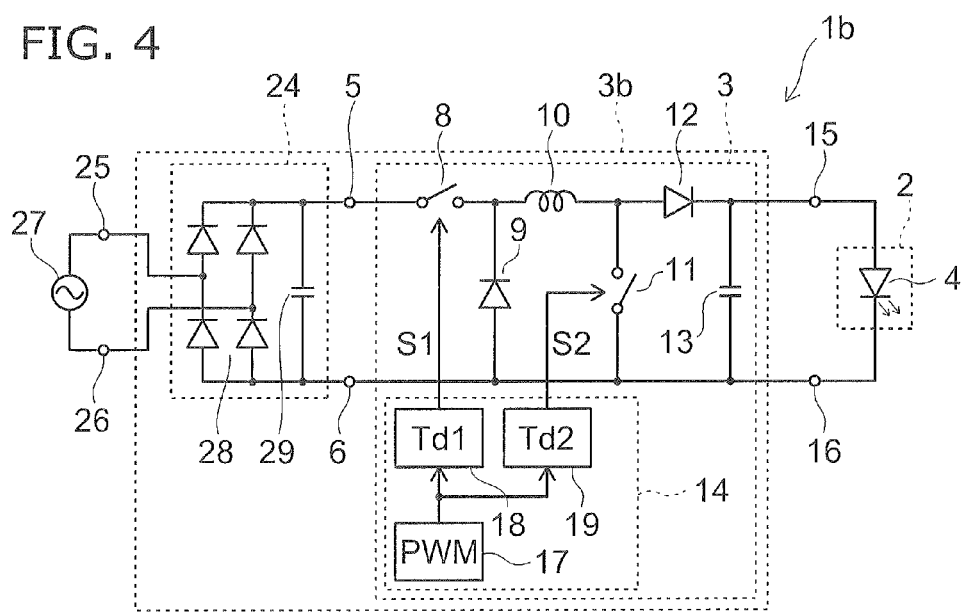
FIG. 4 is a circuit diagram exemplifying a luminaire including a lighting circuit of a third embodiment.

FIG. 4 is a circuit diagram exemplifying a luminaire including a lighting circuit of a third embodiment.

A luminaire 1b of this embodiment is different from the luminaire 1 of the first embodiment in providing a lighting circuit 3b in which a DC power supply circuit 24 is added to the lighting circuit 3. The structure of the luminaire 1b other than the DC power supply 24 is the same as the structure of the luminaire 1.

The lighting circuit 3b includes the lighting circuit 3 and the DC power supply circuit 24. The lighting circuit 3 is similar to the lighting circuit 3 of the first embodiment, a DC voltage VIN is inputted between a high potential input terminal 5 and a low potential input terminal 6, and an output voltage VF and an output current IF are outputted between a high potential output terminal 15 and a low potential output terminal 16.

The DC power supply circuit 24 includes a rectifier circuit 28 and a capacitor 29. The DC power supply circuit 24 converts an AC voltage inputted from an AC power supply 27 through a pair of input terminals 25 and 26 into a DC voltage, and outputs the DC voltage VIN to the high potential input terminal 5 and the low potential input terminal 6. The AC power supply 27 is, for example, a commercial power supply.

The rectifier circuit 28 is, for example, a full-wave rectifier circuit composed of a diode bridge, and rectifies AC voltage. The capacitor 29 smoothes the voltage rectified by the rectifier circuit 28.

Incidentally, although the structure is exemplified in which the DC power supply circuit 24 includes the rectifier circuit 28 and the capacitor 29, another structure may be adopted as long as an inputted AC voltage can be converted into a DC voltage.

Also in this embodiment, after the control circuit 14 turns on the first switching element 8, the control circuit turns off the second switching element 11 at a time earlier by a time Td1 than a time when the first switching element 8 is turned off from on. Accordingly, the same effects as those of the first embodiment can be obtained.

Although the embodiments are described while referring to the specific examples, no limitation is made to those and various modifications can be made.

For example, the illumination light source 4 may be an LED or an OLED, and the illumination light source 4 may be such that plural LEDs are connected in series or in parallel.

Besides, the first switching element 8 and the second switching element 11 may be BJTs or IGBTs.

Besides, the control circuit 14 may be constructed to generate a control signal S2 in which the rising of the PWM signal is delayed by the time Td2 and a control signal S1 in which the falling and rising of the PWM signal are delayed by the time Td1 (Td1<Td2). In this case, the time Ton1 during which the first switching element 8 is on is equal to the high level period of the PWM signal, and the time Tong during which the second switching element 11 is on is shorter than the high level period of the PWM signal by the time Td2.

Besides, in the lighting circuit 3a, although the structure is exemplified in which the control circuit 14a controls the output current IF to the specified value, the structure may be made such that the output voltage VF is controlled to a specified value. Besides, the structure may be made such that the structure in which the output current IF is controlled to the specified value is combined with the structure in which the output voltage VF is controlled to the specified value.

Besides, in the lighting circuit 3b, although the structure including the DC power supply circuit 24 and the lighting circuit 3 is exemplified, the structure may be made such that the DC power supply circuit 24 and the lighting circuit 3a are included.

Although exemplary embodiments have been described, these embodiments have been presented by way of example only, and are not intended to limit the scope of the invention. Indeed, these novel embodiments can be carried out in a variety of other forms, and various omissions, substitutions and changes can be made within the scope not departing from the spirit of the invention. These embodiments and modifications thereof fall within the scope and spirit of the invention and fall within the scope of the invention recited in the claims and their equivalents.

What is claimed is:

1. A lighting circuit comprising:
    a high potential input terminal connected to one end of an external power supply;
    a low potential input terminal connected to one other end of the external power supply;
    a high potential output terminal connected to one end of an illumination load;
    a low potential output terminal connected to one other end of the illumination load;
    a first switching element having one end connected to the high potential input terminal;
    a first rectifying element connected between one other end of the first switching element and the low potential input terminal, a forward direction of the first rectifying element being a direction from the low potential input terminal to the first switching element;
    an inductor having one end connected to the one other end of the first switching element;
    a second switching element connected between one other end of the inductor and the low potential input terminal;
    a second rectifying element connected between the one other end of the inductor and the high potential output terminal, a forward direction of the second rectifying element being a direction from the inductor to the high potential output terminal; and
    a control circuit configured to turn off the second switching element at a time earlier by at least a first time than a time when the control circuit turns the first switching element from on to off.

2. The circuit according to claim 1, wherein the control circuit turns on the first switching element, and then turns on the second switching element.

3. The circuit according to claim 1, wherein the control circuit includes a PWM circuit controlling to cause at least one of an output current flowing through the high potential output terminal and an output voltage at the high potential output terminal to become a specified value.

4. The circuit according to claim 3, wherein the control circuit includes a first delay circuit connected to the PWM circuit and delaying a time when the first switching element is turned off, and a second delay circuit connected to the PWM circuit and delaying a time when the second switching element is turned on.

5. The circuit according to claim 4, wherein the first delay circuit delays falling of a PWM signal generated by the PWM circuit, and the second delay circuit delays rising of the PWM signal.

6. The circuit according to claim 4, wherein a time during which the first switching element is on is longer than a time during which the PWM signal is at a high level.

7. The circuit according to claim 4, wherein
    the first delay circuit delays rising and falling of a PWM signal generated by the PWM circuit, and
    the second delay circuit delays rising of the PWM signal.

8. The circuit according to claim 1, wherein the control circuit includes a detection resistor to detect an output current flowing through the high potential output terminal, and controls the output current to a specified value.

9. The circuit according to claim 1, further comprising a DC power supply circuit converting an AC voltage into a DC voltage and outputting the DC voltage to the high potential input terminal and the low potential input terminal.

10. The circuit according to claim 1, wherein the control circuit maintains the second switching element in the off.

11. A luminaire comprising:
a lighting circuit; and
an illumination load,
the lighting circuit including
a high potential input terminal connected to one end of an external power supply,
a low potential input terminal connected to one other end of the external power supply,
a high potential output terminal connected to one end of the illumination load,
a low potential output terminal connected to one other end of the illumination load,
a first switching element having one end connected to the high potential input terminal,
a first rectifying element connected between one other end of the first switching element and the low potential input terminal, a forward direction of the first rectifying element being a direction from the low potential input terminal to the first switching element,
an inductor having one end connected to the one other end of the first switching element,
a second switching element connected between one other end of the inductor and the low potential input terminal,
a second rectifying element connected between the one other end of the inductor and the high potential output terminal, a forward direction of the second rectifying element being a direction from the inductor to the high potential output terminal, and
a control circuit configured to turn off the second switching element at a time earlier by at least a first time than a time when the control circuit turns the first switching element from on to off; and
the illumination load being supplied with power from the lighting circuit to be lit.

12. The luminaire according to claim 11, wherein the control circuit turns on the first switching element, and then turns on the second switching element.

13. The luminaire according to claim 11, wherein the control circuit includes a PWM circuit controlling to cause at least one of an output current flowing through the high potential output terminal and an output voltage at the high potential output terminal to become a specified value.

14. The luminaire according to claim 13, wherein the control circuit includes a first delay circuit connected to the PWM circuit and delaying a time when the first switching element is turned off, and a second delay circuit connected to the PWM circuit and delaying a time when the second switching element is turned on.

15. The luminaire according to claim 14, wherein the first delay circuit delays falling of a PWM signal generated by the PWM circuit, and the second delay circuit delays rising of the PWM signal.

16. A method of controlling a lighting circuit including first and second, input terminals connected to an external power supply, first and second output terminals connected to an illumination load, a first switching element having a first end connected to the first input terminal, a first rectifying element having a cathode connected to a second end of the first switching element and an anode connected to the second input terminal and the second output terminal, an inductor having a first end connected to the second end of the first switching element, a second switching element having a first end connected to a second end of the inductor and a second end connected to the second input terminal and the second output terminal, and a second rectifying element having a cathode connected to the first output terminal and an anode connected to the second end of the inductor, said method comprising:
turning on the first switching element at a first time;
after a first predetermined amount of time has passed from the first time, turning on the second switching element at a second time;
after a second predetermined amount of time has passed from the first time, turning off the second switching element at a third time; and
after a third predetermined amount of time has passed from the third time, turning off the first switching element.

17. The method of claim 16, wherein the lighting circuit further includes a pulse width modulation circuit that generates a pulse of a predetermined width that is equal to the second predetermined amount of time.

18. The method of claim 17, wherein the light circuit further includes first and second delay circuits, the first delay circuit connected to the pulse width modulation circuit and generating a first control signal after the first predetermined amount of time has passed from a start of the pulse generated by the pulse width modulation circuit, and the second delay circuit generating a second control signal after the third predetermined amount of time has passed from an end of the pulse generated by the pulse width modulation circuit.

19. The method of claim 18, wherein the first control signal turns on the second switching element and the second control signal turns off the first switching element.

* * * * *